(12) United States Patent
Dubois

(10) Patent No.: US 8,821,804 B2
(45) Date of Patent: Sep. 2, 2014

(54) USE OF PARTICLE FILTERS FOR LIMITING CATALYST DEACTIVATION

(75) Inventor: Jean-Luc Dubois, Millery (FR)

(73) Assignee: Arkema France, Colombes (FR)

( * ) Notice: Subject to any disclaimer, the term of this patent is extended or adjusted under 35 U.S.C. 154(b) by 596 days.

(21) Appl. No.: 12/670,910

(22) PCT Filed: Jul. 23, 2008

(86) PCT No.: PCT/FR2008/051383
§ 371 (c)(1),
(2), (4) Date: Jun. 28, 2010

(87) PCT Pub. No.: WO2009/019395
PCT Pub. Date: Feb. 12, 2009

(65) Prior Publication Data
US 2011/0118486 A1    May 19, 2011

(30) Foreign Application Priority Data

Jul. 27, 2007   (FR) ..................... 07 56779

(51) Int. Cl.

| B01J 35/04 | (2006.01) |
|---|---|
| C07D 307/89 | (2006.01) |
| C07C 51/00 | (2006.01) |
| C07C 45/00 | (2006.01) |
| C07C 43/30 | (2006.01) |
| B01J 8/00 | (2006.01) |
| B01J 8/06 | (2006.01) |
| B01J 8/02 | (2006.01) |

(52) U.S. Cl.
CPC .. *B01J 8/006* (2013.01); *B01J 8/06* (2013.01);
*B01J 8/008* (2013.01); *B01J 8/02* (2013.01);
*B01J 2208/00707* (2013.01)
USPC ........... 422/211; 549/248; 562/599; 568/449;
568/472; 568/594

(58) Field of Classification Search
USPC ............. 526/71; 422/211; 562/599; 568/449,
568/472, 594; 549/248
See application file for complete search history.

(56) References Cited

U.S. PATENT DOCUMENTS

| 4,416,676 A | 11/1983 | Montierth |
|---|---|---|
| 5,396,764 A | 3/1995 | Rao et al. |
| 6,545,178 B1 | 4/2003 | Tanimoto et al. |
| 2002/0000067 A1 | 1/2002 | Numata et al. |
| 2002/0038066 A1* | 3/2002 | Strangio et al. ............... 585/440 |
| 2004/0192862 A1 | 9/2004 | Glover |
| 2005/0255014 A1 | 11/2005 | Glover et al. |
| 2006/0235243 A1 | 10/2006 | Fukumoto |
| 2007/0213567 A1 | 9/2007 | Ogawa et al. |

FOREIGN PATENT DOCUMENTS

| EP | 0256352 | 2/1988 |
|---|---|---|
| FR | 2789327 | 2/1999 |

* cited by examiner

*Primary Examiner* — T. Victor Oh
(74) *Attorney, Agent, or Firm* — Lynn B. Morreale

(57) ABSTRACT

The invention relates to the use of monoliths as particle filters for limiting the deactivation of catalysts during catalytic reactions in multi-tubular reactors. The invention is particularly well-suited for catalytic oxidation reactions in the gaseous phase. The invention also relates to multi-tubular reactors including monoliths as particle filters.

16 Claims, 3 Drawing Sheets

USE OF PARTICLE FILTERS FOR LIMITING CATALYST DEACTIVATION

CROSS-REFERENCE TO RELATED APPLICATIONS

This application is a national stage application under 35 U.S.C. §371 of PCT/FR08/051,383, filed Jul. 23, 2008, which claims priority to FR 07.56779, filed Jul. 27, 2007, which are hereby incorporated by reference in their entireties.

FIELD OF THE INVENTION

The present invention relates to heterogeneous catalysis and more particularly to the use of monoliths as particle filters to limit the deactivation of catalysts in fixed bed reactors. The invention also relates to a fixed bed reactor comprising monoliths as particle filters.

BACKGROUND OF THE INVENTION

Numerous industrial processes use heterogeneous catalysis reactions. One of the major problems that arises in these processes is that of catalyst deactivation. There are various ways in which heterogeneous catalysts become deactivated, these including the deposition of organic or inorganic compounds, the poisoning of the active sites, and the loss of metals.

Of these deactivation modes, the formation of a deposit on the surface of the catalysts limits the access by the reagents to the active sites and thus gradually reduces the performance of the reactors. This loss of activity is very often associated with the chemical nature of the catalyst, which encourages secondary reactions or polymerization reactions at its surface. In other instances, the precursors of these deposits are formed upstream of the catalytic bed or are impurities present in the reagents, and these become deposited at the top of the catalytic bed.

The generic term "coke" is used to define the formation of a deposit the nature of which is not exclusively organic: this may be carbon-containing deposits resulting from the degradation of the reagents or from impurities present in the reagents, but may also include inorganic compounds such as catalyst dust, including the dust resulting from processes upstream of the catalytic bed concerned. The coke deposit may also contain particles of metals resulting from the attrition or corrosion of the reactors and/or the units sited upstream of the catalytic beds. In most cases, it is organic/inorganic mixtures combining the various modes of catalyst deactivation.

The formation of coke causes a deterioration in the performance of the catalyst and therefore limits the yield in terms of reaction product.

The loss of activity of the catalyst entails periodically shutting the plants down in order to regenerate the catalyst, for example thermally, and this leads to a lack of productivity of the industrial plant.

When the coke has its precursors upstream of the catalytic bed, one industrial solution for limiting the deactivation of the catalyst is to use a sacrificial bed upstream of the catalytic bed. A sacrificial bed such as this may consist either of catalyst or of beads of chemically inert solid. This sacrificial bed fixes the coke deposits before they reach the catalytic bed. The sacrificial bed is then periodically replaced so as to maintain catalyst performance. In some cases, several successive layers may be stacked up to optimize reactor operation. This is the case, for example, in the hydrotreatment of petroleum cuts; layers of inert solids are used to fix the largest particles, notably of metals produced by the corrosion of the reactors, or the gums produced by the polymerization of unsaturated molecules. Layers of active solids are used to trap metals such as vanadium, nickel, arsenic or sodium which are known poisons of hydrotreatment catalysts. These various layers are placed above the catalysts involved in the hydrotreatment, and thus limit the deactivation thereof.

There are other solutions that have been proposed in order to avoid the deactivation of catalysts through the formation of coke. Patent application EP 1 714 955 describes a method for eliminating the deposition of solid organic substances in a fixed-bed multi-tube reactor, which method consists in introducing a solid that has a Hammett acidity of between −5.6 and 1.5 at the top of the catalyst-filled tube, or between the layers of catalysts, or as a mixture with the catalyst; this method is suited to gas phase catalytic oxidation reactions, more particularly to the oxidation of propylene to acrolein in the presence of molecular oxygen, followed by the oxidation of acrolein to acrylic acid.

In patent application EP 1 734 028, a process for producing acrolein and acrylic acid from propylene or propane using an oxidation reaction in the presence of a catalyst is performed using filtered air as the source of oxygen. Filters, for example of the metal gauze type, are used upstream of the process in order to eliminate any particles present in suspension in the air needed for the process.

Other solutions, like the one described in U.S. Pat. No. 6,545,178, consist in limiting the formation of by-products that are the root cause of the deposits on the catalyst, by using raw materials that are free of impurities. This method does, however, entail prior purification of the raw material, such as propylene for producing acrolein/acrylic acid, and this leads to a process oncost.

In general, conventional industrial processes use, upstream of the catalytic bed, a bed of small-sized beads made of a ceramic material, which are not necessarily chemically inert, as a solution to the problem of catalyst deactivation through the deposit of coke. The beads are simply laid on top of the catalytic bed in each tube of the multi-tube reactor. They are replaced by, for example, sucking out the bed of beads, and tremendous precautions have to be taken in order not to damage the catalytic bed lying under the bed of inert beads. This operation is not only expensive in terms of time, but also exposes personnel. In addition, using suction to unload beads which are often firmly bound together with coke, destroys the beads which have therefore to be replaced each time.

Surprisingly, it has been found that it is possible to limit the deactivation of catalysts during catalytic reactions in multi-tube reactors by using particle filters of monolithic structure known for their application to diesel particle filters.

A subject of the present invention is therefore the use of monoliths such as particle filters to limit the deactivation of catalysts during catalytic reactions in multi-tube reactors, said monoliths comprising parallel channels the walls of which are made of porous ceramic, and the inlet cross section of which is greater than or equal to the outlet cross section.

The monoliths, preferably made as a single piece, are simply placed on the catalytic bed. They can therefore easily be removed and replaced. It is far easier to replace a monolith made as a single piece than, for example, to have to suck up a bed of beads taking extreme care not to damage the catalytic bed that lies under the bed of inert beads.

The monoliths also lead to a lower pressure drop than beds of beads. What happens is that the pressure drop is generated only by the thickness of the wall of the monoliths, which is far thinner than the bed of beads equivalent to the length of the monolith.

Other features and advantages of the invention will become better apparent from reading the description which follows and from referring to the attached figures in which:

DETAILED DESCRIPTION OF THE DRAWINGS

DETAILED DESCRIPTION OF THE INVENTION

The monoliths used in the present invention are filters known for filtering the exhaust gases of diesel engines by reducing certain components including solid particles. These particle filters (PF) are described notably in the work "Les technologies des moteurs de véhicules lourds et leers carburants [Heavy vehicle engine and fuel technology]" volume 1, chapter 5-G. Plassat, ADEME.

The monoliths in the invention comprise parallel channels, the walls of which are generally made of porous ceramic, their inlet cross section being greater than or equal to their outlet cross section, their special feature being that some of the channels are plugged at one end in order to force the incoming gases to flow through the porous walls separating the channels, filtration therefore being performed radially, at right angles to the direction of flow rather than in the direction of flow. For preference, one channel in two is plugged at one end alternately.

Figure 1:
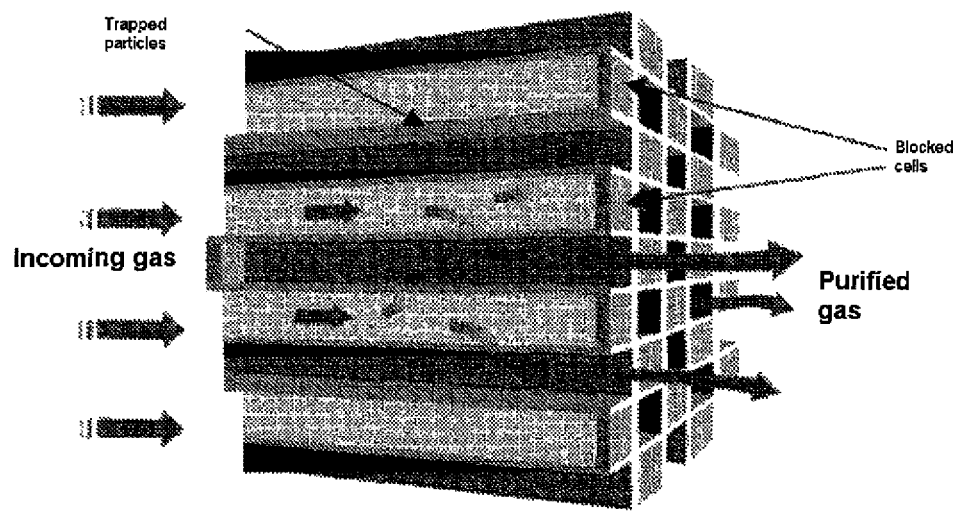
FIG. 1 is a perspective view of a monolith in accordance with the present invention.

The method of trapping of a monolith is illustrated in FIG. 1. The filtration mechanism of ceramic monoliths is both depth filtration and surface filtration. To begin with, the particles are collected in the pores, by deposition, by inertia and by diffusion. As the filter becomes more heavily laden with particles, surface filtration may also be performed.

The nature of the filtering material is a parameter that affects both performance and durability. It has to physically capture the solid particles and hold onto them until the next regeneration.

The monoliths of the invention may be made of various porous ceramics containing silicon carbide, cordierite, aluminum titanate, or mullite.

These materials have numerous advantages:
high filtration efficiency;
very high chemical inertia ensuring that the particle filter itself will not lead to the formation of further impurities;
very good thermal stability which allows the particle filters to be regenerated by high-temperature combustion of the carbon-containing deposits formed therein, it thus being possible for the filters to be reused;
very high thermal conductivity allowing the reagents to be preheated before they arrive on the catalytic bed;
good mechanical strength;
low weight.

For preference, the porous ceramic is silicon carbide which in particular has good resistance to high temperatures.

The wall thickness, the pore size, and the porosity are parameters that may influence the properties of the monoliths. The pore size may vary widely, and in particular may range from 1 to 100 microns. The porosity of the monoliths may range from 10% to 70%.

Examples of monoliths that may be suitable in the context of the present invention are the honeycomb structures made of porous ceramic described in patent FR 2 796 638.

The monoliths may be of symmetrical or asymmetrical mesh.

Figure 2:
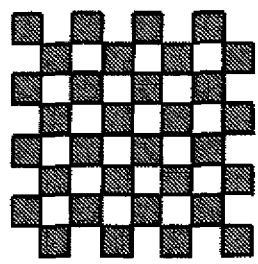
FIG. 2 depict a meshes arrangement for the monoliths used in the invention.

One example of a symmetrical mesh is depicted in FIG. 2, where the patterns, in this instance of square cross section, are identical between the inlet and the outlet, the inlet cross section being equal to the outlet cross section.

Figure 3:
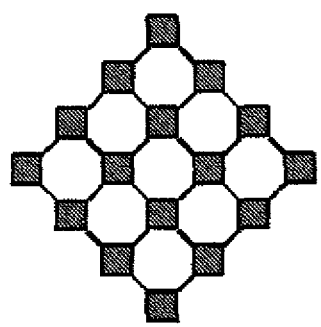
FIG. 3 depict a meshes arrangement for the monoliths used in the invention.
Figure 4:
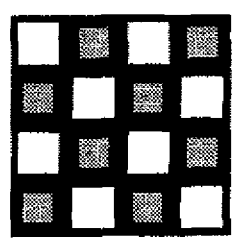
FIG. 4 depict a meshes arrangement for the monoliths used in the invention.
Figure 5:
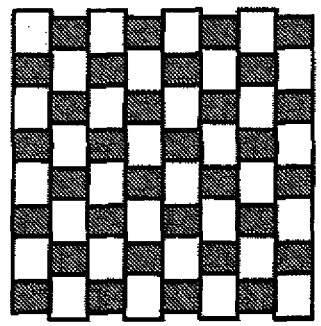
FIG. 5 depict a meshes arrangement for the monoliths used in the invention.
Figure 6:
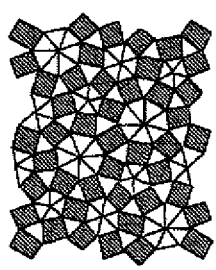
FIG. 6 depict a meshes arrangement for the monoliths used in the invention.
Figure 7:
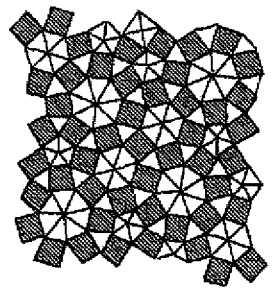
FIG. 7 depict a meshes arrangement for the monoliths used in the invention.
Figure 8:
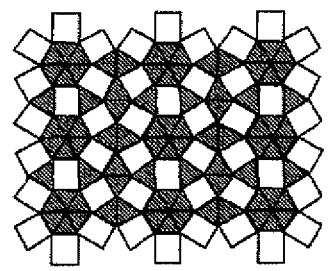
FIG. 8 depict a meshes arrangement for the monoliths used in the invention.

FIGS. 3 to 8 illustrate asymmetrical meshes. An asymmetrical mesh is defined by the fact that the inlet channels and outlet channels do not have the same sizes, while at the same time having a definite and precise geometric shape. Asymmetrical monoliths have the advantage over symmetrical monoliths that they are able to accumulate a larger quantity of coke/particles before they have to be replaced, because the inlet cells have a larger volume and larger exchange area than the outlet cells, and therefore than conventional cells. FIG. 3 illustrates asymmetrical cells with octagonal channels and square channels. The square channels are closed at the inlet end, while the octagonal channels are closed at the other end. This asymmetry is particularly advantageous because the volume available for accumulating coke is far greater. These asymmetrical structures are particularly advantageous where there is a desire to accumulate coke over a lengthy period. FIGS. 4 and 5 depict asymmetrical meshes with square and rectangular channels. It is also possible to have more complicated designs with triangular meshes, as depicted for example in FIGS. 6 to 8. This concept opens up numerous possibilities for geometries which are not restricted to those depicted in the attached figures.

The size of the monoliths according to the invention may vary widely, but the size is preferably tailored to the size of the tubes of the reactor, so as to form just a single piece making removal and refitting extremely easy. The size may vary from a few millimeters to a few hundreds of millimeters, and in particular between 10 and 50 mm. Combining several monoliths, for example by welding them together using a refractor cement, or by arranging them in easily removable baskets, would not be departing from the invention.

The cross section may have various geometries, for example may be square, circular or elliptical.

The length of the monoliths may vary from 5 to 100 cm, and preferably from 10 to 50 cm, and more preferably still, between 15 and 30 cm.

The monoliths may be easily regenerated using the methods well known to those skilled in the art. Regeneration is performed before problems with increase in pressure associated with the overloading of the filter or the plugging of the pores arise.

Figure 9:
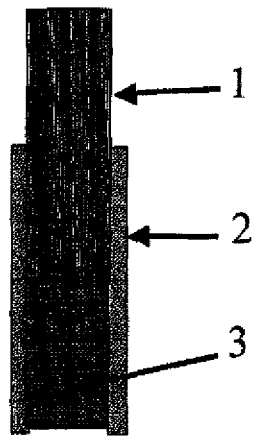
FIG. 9 illustrates one embodiment of the invention.

In one particular embodiment of the invention as illustrated in FIG. 9, the monolith 1 is partially inserted into the reactor 2 at the surface of the catalyst bed 3. This configuration can be obtained only with a monolith, and cannot be obtained with the solutions known to those skilled in the art which consist in using a bed of beads. The particular advantage with this configuration is that it allows more catalyst to be used in the reactor and therefore allows the productivity of industrial reactors to be increased. In a preferred embodiment of the invention, the monoliths are partially inserted into each of the tubes of a multi-tube reactor.

The catalytic reactions that may be performed in the present invention are, for example, gas phase oxidation reactions such as the oxidation of propane or of propylene to acrolein, the oxidation of acrolein or of propane to acrylic acid, the oxidation of isobutene or of tert-butanol to methacrolein or methacrylic acid, the oxidation of methanol to formaldehyde or to dimethoxymethane, the oxidation of o-xylene to phthalic anhydride, the oxidation of butane to maleic anhydride, the oxidation of benzene to maleic anhydride, the oxidation of naphthalene to phthalic anhydride, the oxidation of ethylene to ethylene oxide. Mention may also be made of the dehydration of glycerol to acrolein, the oxydehydration of glycerol to acrylic acid, the conversion of methanol to methyl mercaptan or any other reaction using a fixed multi-tube bed.

The invention also relates to a multi-tube reactor filled with catalyst, in which monoliths comprising parallel channels the walls of which are made of porous ceramic, and the inlet cross section of which is greater than or equal to the outlet cross section, are laid as particle filters to avoid catalyst deactivation.

The present invention will now be further illustrated by examples provided without any implied limitation.

EXAMPLES

Pressure drop measurements were taken in order to compare various particle filter configurations.

Use was made of a reactor consisting of a tube 25.4 mm in inside diameter, filled with particle filter over a height of 25 cm.

The difference in pressure drop was measured directly between the inlet and the outlet of the reactor for each system alone, for various nitrogen flow rates ranging from 0 to 2.7 $m^3/h$. The flow rates are given at ambient temperature and pressure (1 atm and 25° C.).

Figure 11:
FIG. 11 is a photograph of monoliths in accordance with the present invention.

The particle filters tested are listed in the table below:

| Filter | Type | Characteristics/reference |
|---|---|---|
| Ex 1 (comparative) | Glass beads | Diameter 5.2 mm |
| Ex 2 (comparative) | Ceramic foam 30 dpi | Porvair-Selee |
| Ex 3 (comparative) | Macro trap 8 mm | Saint Gobain NORPRO |
| Ex 4 (comparative) | Macro trap 6 mm | Saint Gobain NORPRO |
| Ex 5 | Asymmetrical monolith | See photo in FIG. 11 |
| Ex 6 | Symmetrical monolith 70 cpsi | See photo in FIG. 11 |
| Ex 7 | Symmetrical monolith 200 cpsi | See photo in FIG. 11 |

Figure 10:
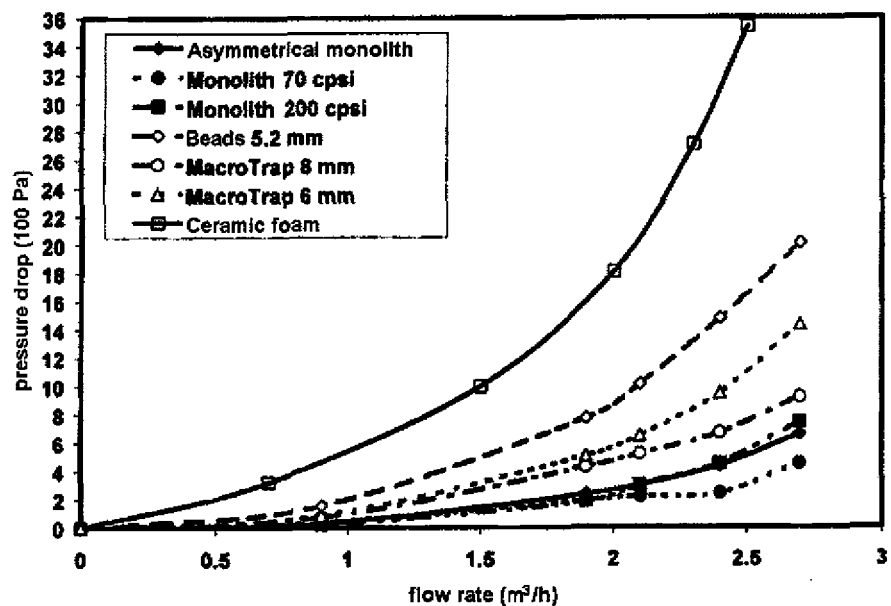
FIG. 10 is a graph of pressure drop versus flow rate.

The change in pressure drop, expressed in Pa as a function of the nitrogen flow rate, is represented in FIG. 10, for each filter tested.

It was found that monoliths had lower pressure drops by comparison with the bed of beads, with a ceramic foam, or with the macro traps tested.

The invention claimed is:

1. A method for limiting the deactivation of catalysts during catalytic reactions in multi-tube reactors, comprising the steps of (1) placing monoliths comprising parallel channels the walls of which are made of porous ceramic, and the inlet cross section of which is greater than or equal to the outlet cross section, some channels being plugged at one end in said reactors, and (2) impeding incoming gas flow such that gases flow through the porous ceramic walls separating the channels, thereby filtering at least a portion of said gases in a direction radial to original gas flow direction.

2. The method as claimed in claim 1, characterized in that one channel in two is plugged at one end alternately.

3. The method as claimed in claim 1, characterized in that the monoliths are of symmetrical mesh.

4. The method as claimed in claim 1, characterized in that the monoliths are of asymmetrical mesh.

5. The method as claimed in claim 1, characterized in that the monoliths are made as a single piece tailored to the size of the tubes of the reactor.

6. The method as claimed in claim 1, characterized in that the monoliths are placed on the catalytic bed of the reactor.

7. The method as claimed in claim 1, characterized in that the monoliths are partially inserted into the tubes of the reactor.

8. The method as claimed in claim 1, characterized in that the catalytic reaction is a gas phase oxidation reaction.

9. The method as claimed in claim 1, characterized in that the catalytic reaction is the oxidation of propylene or of propane into acrolein.

10. The method as claimed in claim 1, characterized in that the catalytic reaction is the oxidation of acrolein or of propane to acrylic acid.

11. The method as claimed in claim 1, characterized in that the catalytic reaction is the oxidation of o-xylene to phthalic anhydride.

12. The method as claimed in claim 1, characterized in that the catalytic reaction is the oxidation of methanol to formaldehyde or to dimethoxymethane.

13. The method as claimed in claim 1, characterized in that the catalytic reaction is the dehydration of glycerol to acrolein.

14. The method as claimed in claim 1, characterized in that the catalytic reaction is the oxydehydration of glycerol to acrylic acid.

15. The method as claimed in claim 1, where said monoliths are single piece monolith filters.

16. The method of claim 1, where the monolith filters are porous ceramic containing one or more of the group consisting of silicon carbide, cordierite, aluminum titanate and mullite.

* * * * *